(12) United States Patent
Vallart et al.

(10) Patent No.: US 9,463,874 B2
(45) Date of Patent: Oct. 11, 2016

(54) METHOD OF REGULATING THE SPEED OF ROTATION OF THE MAIN ROTOR OF A MULTI-ENGINED ROTORCRAFT IN THE EVENT OF ONE OF THE ENGINES FAILING

(71) Applicant: AIRBUS HELICOPTERS, Marignane (FR)

(72) Inventors: Jean-Baptiste Vallart, Marseille (FR); Setareh Taheri, Marseille (FR)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/788,114

(22) Filed: Jun. 30, 2015

(65) Prior Publication Data

US 2016/0001880 A1   Jan. 7, 2016

(30) Foreign Application Priority Data

Jul. 3, 2014   (FR) ...................... 14 01500

(51) Int. Cl.
| | |
|---|---|
| *G05D 1/00* | (2006.01) |
| *B64D 11/00* | (2006.01) |
| *B64C 27/57* | (2006.01) |
| *B64C 27/32* | (2006.01) |
| *G05D 1/08* | (2006.01) |

(52) U.S. Cl.
CPC .............. *B64C 27/57* (2013.01); *B64C 27/32* (2013.01); *G05D 1/0072* (2013.01); *G05D 1/0858* (2013.01)

(58) Field of Classification Search
USPC .......................................... 701/3; 244/17.13
See application file for complete search history.

(56) References Cited

U.S. PATENT DOCUMENTS

| | | | |
|---|---|---|---|
| 6,198,991 B1 | 3/2001 | Yamakawa et al. | |
| 7,223,071 B2 | 5/2007 | Certain | |
| 7,756,612 B2 | 7/2010 | Salesse-Lavergne | |
| 9,008,942 B2 | 4/2015 | Dyrla et al. | |
| 9,278,754 B2 * | 3/2016 | Sonneborn | ............ B64C 27/027 |
| 2007/0118254 A1 | 5/2007 | Barnes et al. | |

(Continued)

FOREIGN PATENT DOCUMENTS

| | | |
|---|---|---|
| EP | 2631172 | 8/2013 |
| EP | 2724939 | 4/2014 |

(Continued)

OTHER PUBLICATIONS

Schaefer et al. 47th Forum American Helicopter Society 1991; p. 1293-1303, "Enhanced energy maneuverability for attack helicopters using continuous variable rotor speed control".

(Continued)

*Primary Examiner* — Thomas G Black
*Assistant Examiner* — Tyler Paige
(74) *Attorney, Agent, or Firm* — Brooks Kushman P.C.

(57) ABSTRACT

A method of regulating the speed of rotation of at least one main rotor of a multi-engined rotorcraft, which rotor is driven at variable speed. In the event of a failure of one of the main engines of the rotorcraft, a control unit generates an NR setpoint that is not less than the nominal drive speed (NRnom) of the main rotor. Thereafter, a calculator acts iteratively to determine a target speed (NRobj) for driving the main rotor to obtain stabilized lift of the rotorcraft by balancing between the torque developed by the main rotor and the rate of increase of its drive speed. The autopilot then causes the pitch of the blades of the main rotor to vary so as to obtain the iteratively calculated target speed (NRobj) until stabilized lift of the rotorcraft is obtained.

20 Claims, 2 Drawing Sheets

(56) References Cited

U.S. PATENT DOCUMENTS

| | | | |
|---|---|---|---|
| 2009/0008499 A1* | 1/2009 | Shaw | B64C 27/20 244/17.23 |
| 2012/0104157 A1* | 5/2012 | van der Westhuizen | B64C 27/18 244/17.27 |
| 2012/0312915 A1* | 12/2012 | Sonneborn | B64C 27/025 244/17.19 |
| 2013/0221153 A1 | 8/2013 | Worsham, II et al. | |
| 2014/0363288 A1* | 12/2014 | Schaeffer | B64C 27/57 416/1 |
| 2014/0365039 A1* | 12/2014 | Schaeffer | B64C 19/00 701/3 |

FOREIGN PATENT DOCUMENTS

| | | |
|---|---|---|
| FR | 2601326 | 1/1988 |
| FR | 2864028 | 6/2005 |
| FR | 2900385 | 11/2007 |
| WO | 2010143051 | 12/2010 |

OTHER PUBLICATIONS

French Search Report for French Application No. 1401500, Completed by the French Patent Office on Apr. 27, 2015, 7 Pages.

* cited by examiner

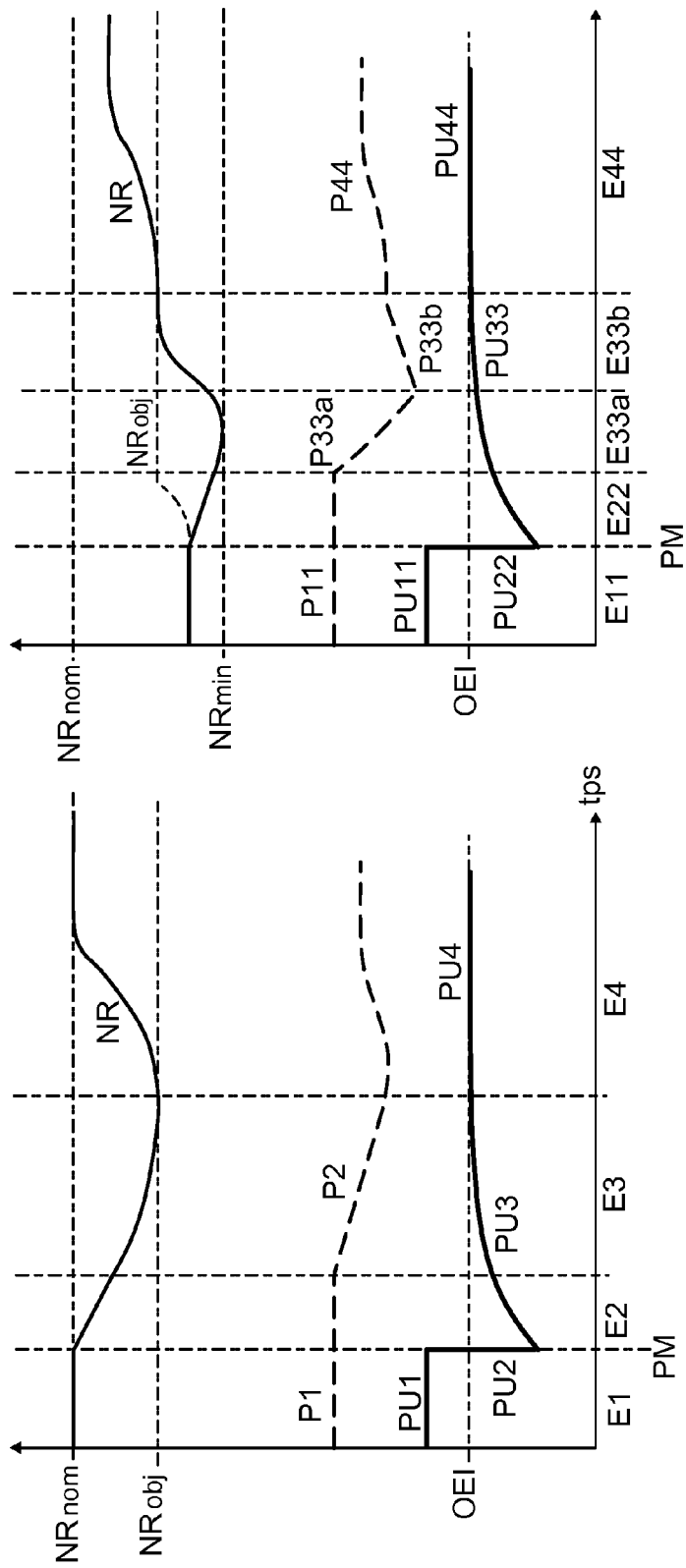

METHOD OF REGULATING THE SPEED OF ROTATION OF THE MAIN ROTOR OF A MULTI-ENGINED ROTORCRAFT IN THE EVENT OF ONE OF THE ENGINES FAILING

CROSS REFERENCE TO RELATED APPLICATION

This application claims priority to French patent application No. FR 14 01500 filed on Jul. 3, 2014, the disclosure of which is incorporated in its entirety by reference herein.

BACKGROUND OF THE INVENTION (1) Field of the Invention

The present invention relates to the field of methods of regulating the operation of the engines in a power plant of a multi-engined rotorcraft. Said power plant comprises in particular main fuel-burning engines, in particular turboshaft engines, that conventionally supply the rotorcraft with the mechanical power needed at least for driving one or more rotors of the rotorcraft.

The present invention lies more particularly in the context of a failure of one of said main engines of the rotorcraft serving to drive at least one main rotor of the rotorcraft at a setpoint speed that is variable, and possibly also serving to drive an anti-torque rotor.

(2) Description of Related Art

Typically, the main rotor provides the rotorcraft at least with lift and possibly also with propulsion and/or its ability to change flight attitude in the specific example of a helicopter. Typically, the anti-torque rotor serves to stabilize the rotorcraft and to guide it in yaw, and it is commonly formed by a tail rotor, or else by at least one propulsive propeller for a rotorcraft having high forward speeds.

Conventionally, the operation of the main engines of a rotorcraft is placed under the control of a full authority digital engine control (FADEC) regulator unit. The regulator unit controls the supply of fuel to the main engines as a function of a setpoint, referred to below as the NR setpoint, relating to a speed of rotation required for the main rotor. The NR setpoint is generated and is transmitted to the regulator unit by a control unit, such as an automatic flight control system (AFCS).

The NR setpoint is commonly generated by the control unit as a function of the mechanical power needs of the rotorcraft, which needs are identified depending on the current flight situation of the rotorcraft, and in particular as a function of mechanical power needs for driving the main rotor. The power consumed by the main rotor may be identified, by way of example, on the basis of evaluating the resisting torque that the main rotor opposes to being driven by the power plant.

It is known to perform calculations for the purpose of anticipating the mechanical power that the power plant is going to need to deliver in order to satisfy the needs of the rotorcraft, so as to ensure that the main rotor is quickly driven at a speed of rotation that matches the NR setpoint. The calculation of the mechanical power needed by the rotorcraft in anticipation may be based on flight control signals issued by a pilot of the rotorcraft, which pilot may equally well be a human pilot or an autopilot.

The flight control signals used to calculate the mechanical power needed by the rotorcraft in anticipation comprise in particular control signals for varying the pitch of the blades of the main rotor, at least collectively, and possibly also cyclically. When the rotorcraft has a tail rotor, that rotor may also be taken into account in the event of a flight control signal leading to a variation in the pitch of its blades, in particular collective variation, when calculating in anticipation the mechanical power that is going to be needed by the rotorcraft.

In this context, there arises the problem of failure of one of the main engines of a twin-engined rotorcraft, or of a plurality of main engines of a rotorcraft that has more than two main engines. Under such circumstances, only one of the main engines of the rotorcraft might remain operational in order, on its own, to supply all of the mechanical power needed by the rotorcraft.

That is why specific power ratings have been defined for regulating the operation of main engines, commonly known as one engine inoperative (OEI) power ratings. OEI power ratings are applied to regulate the operation of a main engine supplying on its own the mechanical power needed by a rotorcraft in flight in the event of at least one other main engine of a multi-engined rotorcraft failing. OEI power ratings are typically defined for specific stages of flight in terms of a given mechanical power level that is to be supplied for a given period by the main engine while ensuring that it is not damaged beyond an acceptable damage threshold.

Various OEI power ratings can potentially be applied by the regulator unit, either automatically (by means of a controller) or else at the request of the human pilot of the rotorcraft in compliance with the flight manual. The following OEI power ratings are commonly defined:

a very short duration OEI power rating in which the operational main engine(s) may be used individually at an emergency power rating for a duration that is brief, of the order of 30 seconds;

a short duration OEI power rating in which the operational main engine(s) may be used individually at an emergency power rating for a duration that is short, of the order of 2 minutes to 3 minutes; and a long duration OEI power rating, in which the operational main engine(s) may be used individually at a maximum power rating for a duration that is long, and potentially unlimited.

The NR setpoint is defined by the control unit so as to obtain a speed of rotation of the main rotor that is referred to below as the speed NR.

The speed NR is traditionally predefined as being substantially constant, being allowed to vary, depending on the flight attitude of the rotorcraft, over no more than a narrow range of speed variation of the order of 5% of a nominal speed NR, while nevertheless not exceeding variation of the order of 1% per second. The impact of such narrow variation on the speed NR is negligible on varying the mechanical power to be supplied by the main engines of the rotorcraft in order to drive the main rotor.

A failure of one of the main engines of a rotorcraft leads to a sudden loss of mechanical power that can be supplied by the power plant, and consequently leads to a drop in the speed NR. Nevertheless, at the instant one of the main engines of the rotorcraft fails, the current speed NR is substantially equal to the current NR setpoint and is still sufficient to enable the pilot to control the attitude of the rotorcraft in conventional manner.

More particularly, and with reference to FIG. 1 of the accompanying sheets, there can be seen a diagram showing how essential events that occur when one of the main engines of a twin-engined rotorcraft fails vary relative to time (t).

In a first step shown E1, both of the main engines of the rotorcraft are operational and, except in a situation of one of the main engines failing, referred to as an engine-failure situation PM, they act together to supply mechanical power PU1 that serves to drive the main rotor at a nominal speed NRnom that is substantially constant for a current given pitch P1 of the blades of the main rotor. In such a context, the speed NR at which the main rotor is driven can nevertheless vary, for a given current pitch P1 of the blades of the main rotor over a range having a value of about 5%, and conventionally extending from 97% to 102% of the nominal speed NRnom.

In the event of an engine-failure situation PM in which one of the main engines fails, the rotorcraft is suddenly placed in a second step E2 before the pilot, who is suddenly confronted with an engine-failure situation PM, has any time to react. An OEI power rating for regulating the sole main engine that is still in activity is immediately put into operation. The OEI power rating that is applied is conventionally selected automatically from a set of OEI power ratings that are applicable depending on the flight stage of the rotorcraft as characterized by its flight mechanics and its travel conditions such as its attitude, its progress altitude, and/or its forward speed, for example, and the selected OEI power rating is put into operation.

During this second step E2, a sudden drop in the available mechanical power PU2 arises as a result of one of the main engines failing, and the speed NR of the main rotor drops given that the current pitch P1 of the blades of the main rotor has remained unchanged in the absence of any reaction from the pilot.

The main engine that continues to be operational is then subjected to acceleration, which has the effect of increasing the mechanical power PU3 it supplies in compliance with the OEI power rating that has been selected and put into operation by the regulator unit. Naturally, it should be understood that the term "main engine that continues to be operational" is used to mean the main engine of the rotorcraft that is operating, as contrasted to the main engine that has failed.

Then in a third step E3, the pilot reacts in order to vary the current collective pitch P2 of the blades of the main rotor, seeking to reduce the power required by the main rotor. Such a variation in the collective pitch P2 serves progressively to limit and then to stop as quickly as possible the drop in the speed NR of the main rotor, before it reaches a critical threshold speed, referred to below as the target speed NRobj, having a constant value of the order of 97% of the nominal speed NRnom.

In a fourth step E4, the main engine that continues to be operational supplies mechanical power PU4 in compliance with the OEI power rating that enables the main rotor to be driven at the substantially constant nominal speed NRnom.

With the lift of the rotorcraft stabilized in spite of the failure of one of the main engines, the pilot can make use of all of the flight controls in order to place the rotorcraft in a stabilized flight situation, enabling the overall behavior of the rotorcraft to be stabilized, while conserving as well as possible the drive speed NR of the main rotor constant at the nominal speed NRnom. Such a stabilized flight situation is commonly recognized as being achieved when the flight parameters of the rotorcraft cease varying while the rotorcraft is making stable progress.

In order to specify in greater detail the concept of stabilized lift, a rotorcraft is commonly recognized as having lift that is stabilized when the drop in the number of revolutions per minute of the main rotor comes to an end, providing the rotorcraft is safe relative to withstanding the forces to which its structure is being subjected, it naturally being understood that said drop in the number of revolutions per minute takes place independently of the behavior of the rotorcraft being controlled by the pilot, whether a human pilot or an autopilot, as in the event of detecting that one of the main engines of the rotorcraft has failed in the context of the present invention.

Such pilot interventions as shown in FIG. 1 are conventionally performed in compliance with flight manuals in the situation of the main rotor being driven at a speed NR that is substantially constant and that is considered as being invariable.

Depending on the equipment of the rotorcraft, it is possible that an autopilot is used to cause the nominal speed NRnom of the main rotor to be reestablished rapidly in the event of one of the main engines failing, by generating automatic flight control signals for modifying the current collective pitch P2 of the blades of the main rotor, as illustrated by the third step E3 shown in FIG. 1.

Nevertheless, technical changes in the field of rotorcraft are tending to encourage the main rotor being driven at a controlled speed NR that is variable relative to the nominal speed NRnom as predefined depending on the flight conditions of the rotorcraft.

By way of example, such a significant variation in the drive speed NR of the main rotor may be used in order to reduce the sound nuisance of the rotorcraft and/or in order to improve its performance during certain stages of flight. By way of indication, the speed of the main rotor may be controlled so as to variable over a range of 5% to 10% of the nominal speed NRnom, and possibly over a larger range depending on technical changes, and more particularly it may be controlled to vary over a range of values potentially lying from 93% to 107% of the nominal speed NRnom.

On this topic, reference may be made for example to the publication "Enhanced energy maneuverability for attack helicopters using continuous variable rotor speed control" (C. G. Schaefer Jr., F. H. Lutze Jr.); $47^{th}$ Forum American Helicopter Society 1991; pp. 1293-1303. According to that document, the performance of a helicopter in a combat situation is improved by varying the drive speed of the main rotor depending on variation in the air speed of the rotorcraft.

Reference may also be made, for example, to the Document U.S. Pat. No. 6,198,991 (Yamakawa, et al.), which proposes reducing the sound nuisance generated by a rotorcraft approaching a landing point by varying the speed of rotation of the main rotor.

On this topic, reference may also be made, by way of example, to the Document US 2007/118254 (G. W. Barnes, et al.), which proposes varying the speed of rotation of the main rotor of a rotorcraft between two values referred to as "low" and "high", under predefined threshold conditions for the values of various parameters associated with the previously-identified flight conditions of the rotorcraft.

Document EP 2 724 939 describes a method of managing an engine failure on a rotary wing aircraft having a hybrid power plant with at least two fuel-burning engines. That method enables the pilot to maneuver the aircraft with engine power but without stressing the engine that remains operational. An electronic control unit EECU is connected to each engine, and electrical energy storage means power an electric motor so that the main rotor is driven by the hybrid power plant.

Document FR 2 900 385 describes a method of piloting a rotorcraft that has a plurality of engines for driving at least one advance and lift rotor. In that method, so long as the rotorcraft has not reached an optimum climb rate, a pitching control signal is determined so that the rotorcraft accelerates with a profile that varies during takeoff, firstly as a function of elapsed time and secondly as a function of the operating state of the engines.

Also by way of example, reference may be made on this topic to Document WO 2010/143051 (Agusta S P A, et al.), which proposes varying the speed of rotation of a main rotor of a rotorcraft in compliance with a map previously established for various flight conditions of the rotorcraft.

There then arises the problem of how to intervene on the behavior of the rotorcraft in the event of one of the main engines failing, given that the main rotor might then be being driven at a speed NR that is low relative to the nominal speed NRnom, and possibly as much as 7% less than the nominal speed NRnom. Under such circumstances, it is much more difficult for the pilot to reestablish drive of the main rotor at a speed NR complying with the NR setpoint.

Consequently, it appears appropriate to provide the human pilot of a twin-engined rotorcraft with automated assistance for reestablishing drive of the main rotor in the event of one of the main engines failing, in the context of it being possible that the main rotor is being driven at a speed NR that is low relative to the nominal speed NRnom at the instant when said one of the main engines fails.

A technological environment of the invention as applied to a single-engined rotorcraft is known, in which automated assistance is provided for the human pilot of the rotorcraft in order to place the main rotor in auto-rotation in the event of the main engine failing.

Such assistance is provided by an automatic device that generates flight control signals acting in the event of the main engine failing to modify the attitude of the rotorcraft, vertically, in pitching, in roll, and/or in yaw, in order to counterbalance the unfavorable aerodynamic effects that occur immediately after a failure of the main engine.

By way of example, reference may be made on this topic to the following documents: FR 2 601 326 (United Technologies Corporation); FR 2 864 028 (Eurocopter SAS); and US 2013/0221153 (Bell Helicopter Textron).

BRIEF SUMMARY OF THE INVENTION

In this context, the present invention provides a method of regulating the speed of rotation, referred to as the speed NR, of at least one main rotor of a multi-engined rotorcraft in the event of a failure of one of the main engines, referred to as an engine-failure situation, of a power plant of the rotorcraft.

Said power plant conventionally supplies the rotorcraft with the mechanical power needed at least for driving rotation of the main rotor.

The method of the present invention is applied in the context, with the exception of an engine-failure situation, of the power plant driving said at least one main rotor in application of a speed setpoint, referred to as the NR setpoint, having a value that is variable and that is calculated by a control unit depending on the current flight conditions of the rotorcraft.

In this context, the value of the NR setpoint may vary over a range of values proportional to the value of a predefined nominal speed for driving the main rotor, and by way of indication over a range of values extending from 93% to 107% of the value of the nominal speed.

The present invention seeks more particularly to provide such a method suitable for assisting a human pilot of the rotorcraft in the event of an engine failure occurring when the drive speed of the main rotor might potentially be significantly low relative to said nominal speed.

In the context of the present invention, the rotorcraft is provided with at least one manual flight control member that, on being moved by a human, generates manual flight control signals leading to a variation in the pitch of the blades of said at least one main rotor. The rotorcraft is also provided with an autopilot generating automatic flight control signals leading to a variation in the pitch of the blades of said at least one main rotor.

The rotorcraft is also provided with said control unit providing said NR setpoint to a regulator unit for regulating the individual operation of the main engines for driving the main rotor at a speed NR in compliance with the NR setpoint.

The regulator unit acts in an engine-failure situation to apply a regulation power rating, known as an OEI power rating, to the operation of at least one main engine that continues to be operational. In conventional manner, said applied OEI power rating is selected by the regulator unit from a plurality of predefined OEI power ratings, depending on an identified flight stage of the rotorcraft.

In this context, the method of the present invention is mainly recognizable in that it comprises the operations set out below:

in the event of an engine-failure situation being identified by the regulator unit, the regulator unit applies said OEI power rating and transmits "engine-failure" data to the control unit relating to the engine-failure situation being identified by the regulator unit; and thereafter, on the control unit receiving said engine-failure data, the control unit generates said NR setpoint with a value that is not less than, and that is preferably equal to, the value of said nominal speed.

In this context, the rotorcraft may be in a favorable flight situation in which the value of the current NR setpoint is greater than or equal to the value of the nominal drive speed of the main rotor. In such a favorable flight situation, it is considered that the control unit generating said NR setpoint with a value that is not less than said nominal speed is appropriate for rapidly obtaining stabilized progress of the rotorcraft, at least in terms of rapidly obtaining stabilized lift for the rotorcraft.

Nevertheless, in the context of the present invention, the value of the current speed NR may be significantly less than the value of the nominal speed, and in particular it may be less than 97% of the nominal speed. In such an unfavorable flight situation, the difficulty for the human pilot in obtaining stabilized lift for the rotorcraft is increased compared with said favorable flight situation. Since the human pilot is in a difficult situation, it is proposed, once the control unit has received said engine-failure data, to assist the human pilot in controlling the flight attitude of the rotorcraft.

More particularly, in said unfavorable flight situation in which the current speed NR is less than the value of the nominal speed, a computer acts iteratively to calculate a drive speed for the main rotor, referred to as the target speed.

The target speed is calculated iteratively as follows:

depending on the current flight situation of the rotorcraft, by identifying firstly the available mechanical power that can be supplied by the power plant in compliance with the current OEI power rating, and secondly the current lift provided by the main rotor, in particular as determined in compliance with the current flight control signals generated by the pilot, which may equally well be a human pilot or the autopilot; and then by identifying a maximum lift that can be provided by the main rotor providing that stabilized lift of the rotorcraft has been obtained, on the basis of a speed NR suitable for being reached in as short a length of time from the current speed NR and going to the target speed, and naturally under conditions of the rotorcraft progressing safely.

In such a context, said target speed is not predetermined, being preferably calculated iteratively at a given rate, of the order of 40 times per second, for example, and being variable depending on the flight situation of the rotorcraft as current during each of the sequences for calculating the target speed.

Such an iterative calculation of the target speed is based on sharing said available mechanical power between the drive torque driving the main rotor and the drive speed NR of the main rotor so that the lift obtained by the main rotor is optimized as quickly as possible in order to minimize the loss of ground height for the rotorcraft.

It should be observed that said computer is possibly incorporated in any one of the computer means of the rotorcraft, such as, in particular, by being incorporated in the autopilot, or preferably in the regulator unit.

Thereafter, in the situation where the current speed NR is less that the target speed, the autopilot generates automatic flight control signals causing the pitch of the blades of the main rotor to vary until the main rotor is driven at said target speed.

Under such conditions in an engine-failure situation, a drive speed of the main rotor that might be significantly slower than the nominal speed is taken into account almost instantaneously by the computer.

In the absence of any reaction from the pilot suddenly confronted with an engine-failure situation, the regulator unit begins by generating an NR setpoint having a value that is not less than said nominal speed, and the computer acts iteratively to calculate the target speed used by the autopilot for generating automatic flight control signals for quickly obtaining stabilized lift of the rotorcraft.

Stabilized lift of the rotorcraft is obtained without necessarily driving the main rotor at a speed in compliance with the nominal speed. The time required to achieve stabilization of the lift of the rotorcraft starting from a drive speed of the main rotor that might potentially be low is made shorter, by the computer generating the target speed iteratively, with the autopilot generating the flight control signals under the dependency of that target speed so as to obtain said stabilized lift as quickly as possible.

Finally, it can be seen that in spite of the main rotor being driven at a speed that is potentially low, the human pilot is assisted in an engine-failure situation, with the rotorcraft being piloted before any reaction is humanly possible. The piloting assistance that is provided serves to move the rotorcraft towards favorable flight conditions by obtaining stabilized lift for the rotorcraft under the control of the computer.

After the lift of the rotorcraft has been stabilized, proposals are preferably made to generate flight control signals for ensuring a stabilized flight situation for the rotorcraft. Such a stabilized flight situation is conventionally applied by generating flight control signals that cause at least the pitch of the blades of the main rotor to vary, and possibly also, where appropriate, that cause an anti-torque device to be used, as conventionally formed by at least one auxiliary rotor.

Nevertheless, after the period needed for stabilizing the lift of the rotorcraft, the human pilot is potentially capable of reacting. That is why it is selected to operate the flight control signals for obtaining the stabilized flight situation either manually by the human pilot or automatically by the autopilot that has been set to operate in at least one higher mode of operation for providing the rotorcraft with guidance relative to its various progress axes, such as typically at least its pitching axis, its roll axis, and its yaw axis, and possibly also vertically.

To this end, in an implementation of the invention and on obtaining said stabilized lift for the rotorcraft, the autopilot may potentially be set to operate in a mode of operation whereby the autopilot calculates a stabilized flight situation for the rotorcraft and generates automatic flight control signals in compliance with said stabilized flight situation. As mentioned below, the autopilot may potentially be set in advance to operate in such a mode of operation identifying said stabilized flight situation, or it may be set to operate in that mode on request of the pilot.

Preferably, said stabilized flight situation is calculated by the autopilot in compliance with the rotorcraft advancing at medium speeds, by way of indication, a forward speed of the rotorcraft lying in the range 45 knots (kt) to 100 kt. Specifically, it is chosen to identify said stabilized flight situation for a forward speed of the rotorcraft that is likely to consume the lowest possible mechanical power.

In addition, the stabilized flight situation may be calculated by the autopilot taking account of at least one of the rotorcraft flight parameters comprising: the current ground height of the rotorcraft; the current air speed of the rotorcraft; and the temperature of the ambient outside air surrounding the rotorcraft.

In an advantageous implementation, said stabilized flight situation of the rotorcraft is calculated on the basis of the autopilot making use in particular of the current flight stage of the rotorcraft to select a flight stage to be reached from among a plurality of flight stages that have previously been stored, for example in a database.

In non-exhaustive implementations of the method of the invention, the autopilot calculates said stabilized flight situation at least as follows:

in a stage of flight of the rotorcraft close to the ground, by way of example at a height less than about 30 feet (ft), the autopilot calculates the stabilized flight situation in compliance with the rotorcraft being guided using a procedure for landing the rotorcraft; and in a stage of automatic takeoff of the rotorcraft in which the rotorcraft is guided by the autopilot in application of a pre-established takeoff procedure, the stabilized flight situation is calculated by the computer in compliance with the rotorcraft being guided with the takeoff procedure.

Preferably, the autopilot calculates said stabilized flight situation in application of an NR setpoint having a value not less than a speed threshold. Said value of said speed threshold is, in particular, predefined depending on a minimum acceptable speed of rotation of the main rotor for obtaining safe flight of the rotorcraft, such as preferably a speed of the order of 97% of the nominal speed.

Furthermore, the autopilot is potentially set to operate in its mode for calculating said stabilized and armed flight situation in the following alternative manners:

by a manual setting control signal issued by a human pilot put into a situation of being able to react on the behavior of the rotorcraft as a result of stabilized lift being obtained for the rotorcraft;

by an automatic mode setting control signal generated as a result of the regulator unit generating said engine-failure data; and/or by the autopilot having its mode set before a potential engine-failure situation, in order to obtain a good reaction time span for the human pilot.

While the autopilot is set to operate in a calculation mode for calculating said stabilized flight situation, the autopilot can be taken out of that calculation mode by the human pilot of the rotorcraft generating a manual control signal for that purpose.

In another implementation and on said stabilized lift of the rotorcraft being obtained, the human pilot of the rotorcraft generates manual flight control signals for obtaining stabilized flight guidance of the rotorcraft in application of a pre-established emergency procedure to be found in the flight manual.

Said emergency procedure is in compliance with stabilized flight guidance of the rotorcraft placed under defined unfavorable travel conditions involving the rotorcraft traveling at high altitude, for example at a ground height greater than 500 ft, with the ambient outside air surrounding the rotorcraft at a high temperature, by way of indication at a temperature of at least about 30° C., and with the main rotor being driven at a low speed NR of rotation, in particular a speed of less than 97% of the nominal speed.

Taking said emergency procedure into account makes it possible to respond as well as possible to safe travel being obtained for the rotorcraft regardless of the current travel conditions of the rotorcraft. The emergency procedure is advantageously a single defined procedure that is applicable to all current flight conditions of the rotorcraft in an engine-failure situation, so as to avoid making more complex the work of the human pilot placed in an emergency situation as a result of one of the main engines of the rotorcraft failing.

Furthermore, the application of an NR setpoint having a value not less than said speed threshold is preferably performed by limiting variation of the pitch of the blades of the main rotor relative to a predefined pitch threshold for the blades of the main rotor.

In an implementation, at least any one of the manual flight control members for causing variation in the pitch of the blades of the main rotor is advantageously provided with a device for generating tactile signals. The tactile signal generator device produces at least a first tactile signal in the event of the flight mechanics of the rotorcraft detecting a pitch for the blades of the main rotor that is equivalent to said pitch threshold.

In an implementation, the device for generating tactile signals potentially generates a second tactile signal in the event of the flight mechanics of the rotorcraft identifying a pitch for the blades of the main rotor that is greater than said pitch threshold. Such provisions seek to inform the human pilot that the mechanical power limits defined in the current OEI power rating applied by the regulator unit have been exceeded.

By way of example, the tactile signal generator device is a vibration generator device. Also by way of example, the tactile signal generator device is a device that opposes a resisting force against the human pilot moving the manual flight control member.

Furthermore, the power plant preferably includes at least one auxiliary power unit. Under such circumstances, and in the event of the control unit identifying a deficit in power consumption by the main rotor relative to quickly obtaining stabilized lift of the rotorcraft, the regulator unit generates a request for making use of said at least one auxiliary power unit.

In various implementations, said at least one auxiliary power unit may equally well be an electric motor and/or a fuel-burning engine.

It should be recalled that said auxiliary power unit (APU) is typically constituted by an auxiliary fuel-burning engine, in particular a turboshaft engine, with its operation being controlled by the regulator unit. Such an auxiliary power unit is typically dimensioned to provide the mechanical power needed for driving auxiliary members of the rotorcraft (compressors, electrical machines, equipment for services, by way of example) when the rotorcraft is on the ground, while being unsuitable on its own for driving the rotor(s) of the rotorcraft in flight, in particular in an engine-failure situation.

Nevertheless, it may be appropriate to make use of the auxiliary power unit in flight for contributing to driving the main rotor by supplying top-up mechanical power during certain specific stages of flight of the rotorcraft, which top-up mechanical power is additional to the mechanical power that is provided essentially by the main engines, which are themselves dimensioned to be capable of driving the rotor(s) of the rotorcraft in flight, and where necessary of doing so individually, in the event of an engine failure.

In this context, it should be understood that the operation of the auxiliary power unit is not subjected to the regulation OEI power ratings in the event of one of the main engines failing.

In a preferred implementation, the regulator unit generates a control signal for regulating the individual operation of each of the main engines while taking account at least of firstly the NR setpoint and secondly an anticipation for the mechanical power to be supplied by the power unit as typically identified by the flight mechanics of the rotorcraft leading to at least one variation in the pitch of the blades at least of the rotary wing of the main rotor.

It should also be understood that setting the autopilot to operate in a secondary mode of operation is distinct and does not impede potentially simultaneously setting the autopilot to operate in at least one higher mode of operation for providing automatic guidance for the rotorcraft relative to at least any one of its progress axes.

BRIEF DESCRIPTION OF THE SEVERAL VIEWS OF THE DRAWINGS

An implementation of the present invention is described with reference to the figures of the accompanying sheets, in which:

FIG. 1 is a diagrammatic chart showing how essential events take place as a function of time (t) in the prior art in the event of a failure of one of the main engines of a twin-engined rotorcraft, as described above;

FIG. 2 is a diagrammatic chart showing how essential events take place as a function of time (t) in an implementation of the invention in the event of a failure of one of the main engines of a twin-engined rotorcraft.

DETAILED DESCRIPTION OF THE INVENTION

Figure 3:
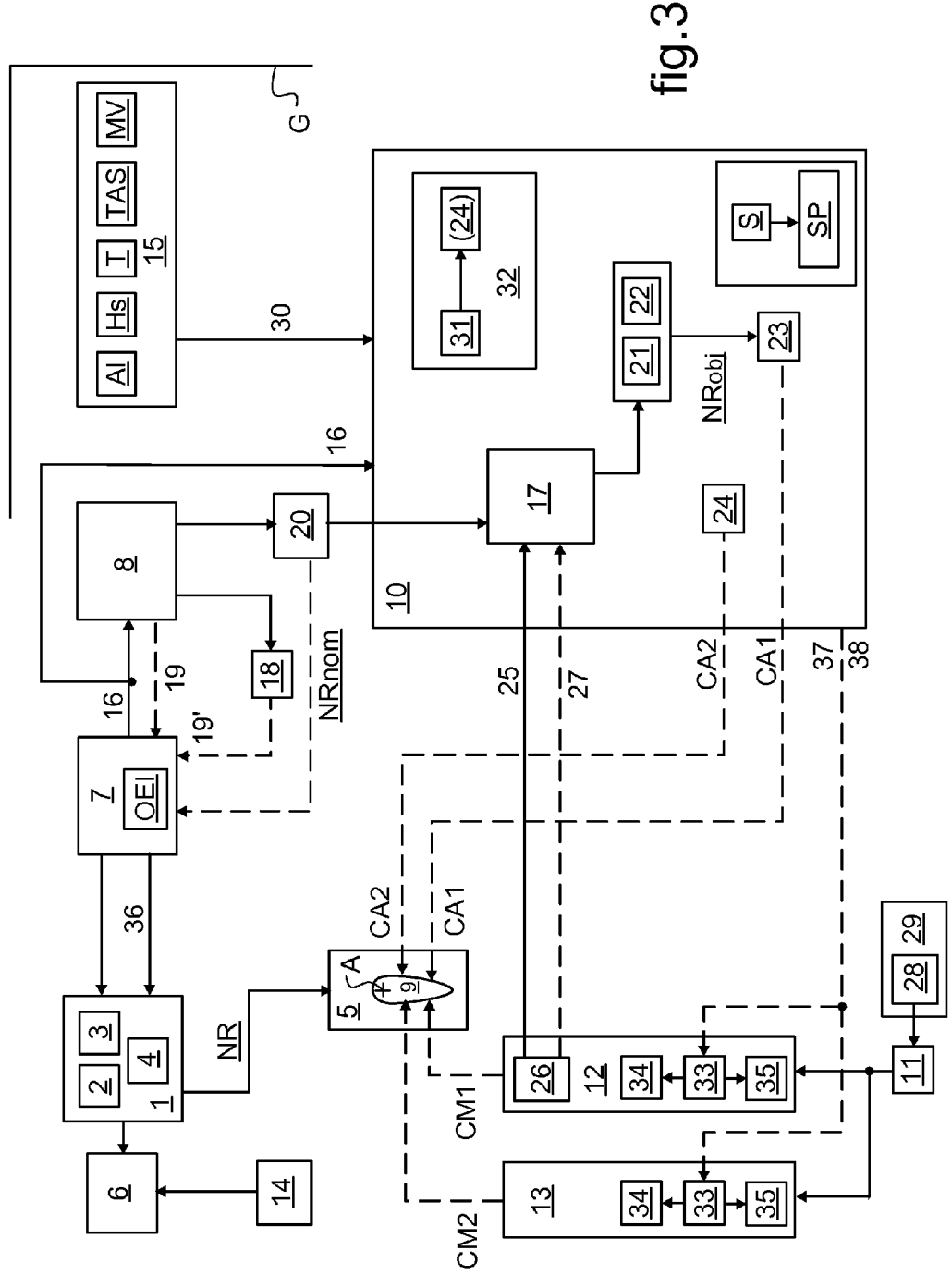
FIG. 3 is a diagram showing in detail the operations performed when executing a method of the present invention in a preferred implementation.

In FIG. 2, the main rotor of a twin-engined rotorcraft G is driven, in the event of an engine failure, at a speed, referenced NR, that is significantly lower than a predefined nominal speed NRnom. The main rotor of the rotorcraft G is potentially driven at a speed NR that is variable under the control of a control unit taking account of the flight conditions of the rotorcraft, such as the physicochemical parameters of the ambient air surrounding the rotorcraft, its forward speed, or its height above the ground, for example.

Such provisions seek to enhance the needs of the rotorcraft G for performance, in particular while hovering, but also in cruising flight, and/or for reducing the sound nuisance generated by the rotorcraft G during specific stages of flight, such as, in particular, a stage of the rotorcraft approaching a landing point.

As in the context shown in FIG. 1, in a first step E11, the main engines of the rotorcraft G are both operational and, except in an engine-failure situation PM, they act together to deliver mechanical power PU11 serving to drive the main rotor at a speed NR that is substantially constant at any given instant for a given current pitch P1 of the blades of the main rotor.

In the event of an engine-failure situation PM applying to one of the main engines, the rotorcraft G is suddenly placed in a second step E22 before the pilot, who is suddenly confronted with the engine-failure situation PM, has any time to react.

An OEI power rating for regulating the single operational main engine remaining in activity is immediately put into operation, and is conventionally applied by a regulator unit. The OEI power rating that is applied is automatically selected from a variety of OEI power ratings that are applicable depending on the flight stage of the rotorcraft G, and armed.

During this second step E22, a sudden drop in the available mechanical power PU22 is caused as a result of one of the main engines failing in an engine-failure situation PM. Consequently, since the current pitch P11 of the blades of the main rotor remains constant in the absence of any reaction from the pilot, the speed of rotation NR of the main rotor drops.

However, given that the main rotor is being driven at a speed NR that is significantly lower than the nominal speed NRnom, the human pilot is put into a situation that is particularly difficult for managing to stabilize the progress of the rotorcraft G.

The speed NR at which the main rotor is driven can potentially come close to a minimum acceptable value NRmin, and the length of time available for reestablishing rotorcraft progress under safe flying conditions is potentially very short.

In this context, proposals are made to assist the human pilot in placing the rotorcraft under safe flying conditions in the event of an engine failure.

More particularly, it is decided initially to stabilize the lift of the rotorcraft as provided by the main rotor, and then subsequently to control the operation of the flight mechanics of the rotorcraft, whether by the human pilot or by the autopilot of the rotorcraft, in compliance with applying a stabilized flight situation to the rotorcraft serving to stabilize the progress of the rotorcraft from the current flight situation and relative to all of its progress axes.

In a favorable flight situation that is not shown, in which the speed NR at which the main rotor is being driven is equal to or greater than the nominal speed NRnom, the current speed NR at which the main rotor is being driven is maintained.

In this situation, the control unit continues to generate a setpoint, referred to as the NR setpoint, and the pilot of the rotorcraft can generate flight control signals serving to increase the torque consumed by the main rotor in compliance with making maximum use of the available mechanical power delivered by the main engine still in operation, and also having the effect of reducing the speed NR.

Nevertheless, and as shown in FIG. 2, it is possible that an unfavorable flight situation will be identified in which the speed NR at which the main rotor is being driven is significantly lower than the nominal speed NRnom at the instant when the engine failure occurs.

Under such circumstances, and in a third step E33a, the pitch P33a of the blades of the main rotor is rapidly modified by an autopilot of the rotorcraft in response to a request issued by the control unit for an NR setpoint having a value that is equal to or greater than the nominal speed NRnom. This first step makes it possible immediately to slow down the drop in the number of revolutions of the main rotor.

Furthermore, a computer set in operation as soon as the engine-failure event is detected calculates a speed referred to as the target speed NRobj, for driving the main rotor in compliance with making use of a given maximum mechanical power delivered by the power plant in compliance with the applied current OEI power rating. The target speed is identified depending on the current flight situation of the rotorcraft, by taking account of a combination of criteria having respective values that are calculated iteratively by the computer. Said criteria include the shortest possible duration for obtaining a target speed NRobj for the main rotor consuming torque that provides stabilized lift for the rotorcraft.

Starting from the target speed NRobj calculated by the computer, the autopilot set to operate in a specific mode of operation calculates the collective pitch P33b of the blades of the main rotor that is to be applied so as to obtain, as quickly as possible, said stabilized lift of the rotorcraft, and it generates automatic flight control signals that cause the collective pitch of the blades of the main rotor to vary in compliance with the pitch P33b calculated by the autopilot, as shown in step E33b.

Under these conditions, during the initial step E22, and subsequently E33a and E33b, the mechanical power PU33 supplied by the engine that is operational increases progressively until it reaches a mechanical power PU44 that is in compliance with the OEI power rating.

At the end of the step E33b in which the lift of the rotorcraft is stabilized, the speed NR at which the main rotor is driven is maintained higher than the target speed NRobj and the mechanical power PU44 is in compliance with applying the current OEI power rating. At this stage, the human pilot can potentially react and decide to issue manual flight control signals seeking to put the rotorcraft into a stabilized flight situation relative to all of its progress axes, in particular the pitching axis, the roll axis, and the yaw axis, and also vertically.

In this context that is not shown, the manual flight control signals issued by the pilot are in compliance with applying an emergency procedure typically found in the flight manual and relating to the actions a human pilot must perform in order to stabilize the progress of the rotorcraft in the event of engine failure. The emergency procedure is advantageously drawn up to cope with flight conditions that are particularly unfavorable in the event of engine failure, such as, typically, the rotorcraft flying at a height above the ground of about 500 feet, at a high temperature for the ambient outside air surrounding the rotorcraft of the order of more than 30° C., and/or with the main rotor being driven at a speed of rotation that is low, and in particular less than 97% of the nominal speed NRnom.

Still at the end of step E33b, and as shown in FIG. 2, during a following step E44, the autopilot is potentially set to operate in a mode for calculating a stabilized flight situation for the rotorcraft. Once the stabilized flight situation for the rotorcraft has been identified by the rotorcraft, the NR setpoint generated by the control unit and the automatic flight control signals generated by the autopilot modify the pitch P44 of the blades, at least of the main rotor and possibly also of an auxiliary anti-torque rotor, so as to place the rotorcraft in flight conditions that correspond to the stabilized flight situation identified by the autopilot.

FIG. 3 shows in detail the various operations of a preferred method of the present invention for procuring regulation of the operation of a power plant of a twin-engined rotorcraft in accordance with the provisions of the invention as shown in FIG. 2 and as described above.

In FIG. 3, a twin-engined rotorcraft has a power plant 1 with two main engines 2 and 3 and at least one auxiliary power unit 4. The power plant 1 is used to drive the members of the rotorcraft that consume mechanical power, including one or more rotors 5, 6. The rotors of the rotorcraft comprise in particular at least one main rotor 5 providing the rotorcraft at least with lift, and at least one auxiliary rotor 6 providing at least stabilization and yaw guidance for the rotorcraft.

In this context, and in conventional manner, each of the main engines 2 and 3 is dimensioned so as to be capable of driving the rotor(s) 5, 6 of the rotorcraft in the event of one of the main engines 2, 3 failing.

In contrast, the auxiliary power unit 4 delivers too little power for it to be capable on its own of driving the rotor(s) 5, 6 of the rotorcraft. Such an auxiliary power unit may possibly be constituted by an electric motor and/or a fuel-burning engine forming an auxiliary power unit commonly abbreviated APU.

The operation of the power plant 1 is controlled by a regulator unit 7 in compliance with a speed setpoint referred to as the NR setpoint 19, as generated by a control unit 8 and relating to a drive speed required by the main rotor 5. As mentioned above, the speed NR at which the main rotor 5 is to be driven may depart significantly from a nominal speed NRnom in compliance with applying the NR setpoint 19 as generated by the control unit 8.

Furthermore, a modification to the attitude of the rotorcraft can be undertaken by a pilot generating flight control signals for modifying the pitch of the rotary wing blades 9 of the rotor(s) 5, 6. For this purpose, said blades 9 are operated by linkages to pivot about respective pitch variation axes A.

Conventionally, the blades 9 of the main rotor 5 are moved collectively about their pitch variation axes A in order to modify the altitude of the rotorcraft and/or cyclically in order to modify the attitude of the rotorcraft in pitching and in roll. The blades of the auxiliary rotor 6 are conventionally operable collectively about their pitch variation axes in order to stabilize the rotorcraft and guide it in yaw.

The pilot of the rotorcraft may be an autopilot 10 generating automatic flight control signals, or it may be a human pilot 11 generating manual flight control signals CM1, CM2 by moving manual flight control members 12, 13, 14.

Typically, the manual flight control members comprise a pitch lever 12 enabling the human pilot 11 to modify the pitch of the blades 9 of the main rotor 5 collectively, a cyclic stick 13 enabling the human pilot 11 to modify the pitch of the blades 9 of the main rotor 5 cyclically, and pedals 14 enabling the human pilot 11 to modify the pitch of the blades of the auxiliary rotor 6 collectively.

The flight attitude of the rotorcraft may also be modified by means of the flight mechanics of the rotorcraft being actuated under the effect of flight control signals generated equally well by the human pilot 11 or by the autopilot 10.

The rotorcraft is also conventionally fitted with on-board instrumentation 15 providing various kinds of information about the flight conditions of the rotorcraft, such as for example: its altitude Al and/or ground height Hs; the temperature T of the ambient outside air surrounding the rotorcraft; the forward speed TAS of the rotorcraft; and/or the positioning of the flight mechanics MV.

In this context, in the event of a failure of one of the main engines 2, 3, the regulator unit 7 controls the operation of the still operational main engine 2, 3 in compliance with applying an OEI power rating. Depending on the conditions and/or the stages of flight of the rotorcraft, the OEI power rating that is applied by the regulator unit 7 is selected from among a plurality of predefined OEI power ratings, such as conventionally a very short duration OEI power rating, a short duration OEI power rating, and a long duration OEI power rating.

In the event of an engine failure, the regulator unit 7 transmits engine-failure data 16 about the engine-failure situation to the control unit 8. Depending on various flight situations, a computer 17 takes action to modify the behavior of the rotorcraft.

In a favorable situation 18 in which the main rotor 5 is being driven at a speed NR of rotation that is equal to or greater than the nominal speed NRnom, the NR setpoint 19' generated by the control unit 8 is at least equal to and possibly greater than the nominal speed NRnom. Operations for varying the pitch of the blades 9 of the rotor(s) 5, 6 can then be undertaken to stabilize the flight attitude of the rotorcraft, and this can be done in particular by the human pilot 11, as shown in FIG. 1, or else possibly by the autopilot 9.

Nevertheless, in an unfavorable situation 20 in which the main rotor 5 is being driven at a speed of rotation that is significantly lower than the nominal speed NRnom, the control unit 8 generates an NR setpoint 19 having a value that is less than the value of the nominal speed NRnom. Thereafter, the computer 17 is operated initially to stabilize as quickly as possible the lift provided by the main rotor 5.

To this end, the computer 17 acts iteratively to calculate said target speed NRobj mentioned in the description of FIG. 2. The target speed NRobj is calculated iteratively given the current flight situation of the rotorcraft in order to identify the conditions for obtaining stabilized lift for the rotorcraft in as short as possible a length of time.

The target speed NRobj is calculated iteratively on the basis of identifying a combination between a compatible torque 21 consumed by the main rotor and the shortest possible length of time 22 defined depending on the rate of increase obtained in the drive speed of the main rotor 5 from its current drive speed to said target speed NRobj, the target speed as calculated iteratively being less than the nominal speed NRnom and greater than the current speed NR at which the main rotor 5 is being driven.

When the current speed at which the main rotor 5 is being driven is less than the target speed NRobj, the autopilot 10 generates automatic flight control signals CA1 causing the pitch of the blades 9 of the main rotor 5 to vary so as to obtain the stabilized lift conditions 23 for the rotorcraft as identified by the computer 17. Furthermore, providing the autopilot 10 is set to operate in a specific mode of operation, it acts to determine a stabilized flight situation 24 for the rotorcraft along its various progress axes.

The autopilot 10 may be set beforehand to operate in the mode for calculating the stabilized flight situation 24 as a precaution for a possible engine failure, or indeed it may be set automatically to operate in this mode as a result of the regulator unit 7 transmitting the engine-failure data 16 to the autopilot 10. The autopilot 10 may also be set to operate in this mode by the human pilot 11 issuing a manual control signal 25 for setting the autopilot 10 by means of a control button 26 that is dedicated to this purpose.

Thereafter, the autopilot 10 generates automatic flight control signals CA2 for modifying the pitch of the blades 9 of the rotor(s) 5, 6 in order to guide the rotorcraft in compliance with the previously determined stabilized flight situation 24.

The human pilot 11 may also act at any time via the control button 26 to generate a manual control signal 27 for overriding the autopilot 10 to enable the human pilot 11 to act in manual guidance mode on the behavior of the rotorcraft for the purpose of stabilizing the attitude of the rotorcraft relative to its various progress axes. Under such circumstances, the human pilot 11 applies an emergency procedure 28 included in the flight manual 29 of the rotorcraft.

More specifically, it is proposed that the autopilot 10 determines the stabilized flight situation 24 of the rotorcraft on the basis of various kinds of information 30 transmitted by the on-board instrumentation 15. The autopilot 10 acts in particular to determine that the rotorcraft is in a stabilized flight situation 24 by taking account of various parameters such as the current air speed TAS of the rotorcraft, the ground height Hs of the rotorcraft, and/or the temperature T of the ambient outside air surrounding the rotorcraft.

A database 32 listing various respective stages of flight 31 of the rotorcraft can be used in order to determine which stabilized flight situation 24 is to be applied depending on the current flight stage of the rotorcraft, such as for example the rotorcraft being in a stage of flight close to the ground and/or in an automatic takeoff or landing stage.

In an implementation of automatic mode for rotorcraft guidance, the autopilot 10 determines the automatic flight control signals CA1, CA2 to be used for obtaining said stabilized flight situation of the rotorcraft, in application of an NR setpoint 19 having a value that is not less than a predefined speed threshold S.

The value of the first speed threshold S is in particular predefined to be greater than 97% of the nominal speed NRnom, in order to maintain drive of the main rotor at a speed NR that ensures safe progress of the rotorcraft. An NR setpoint 19 generated by the control unit 8 and having a value not less than said speed threshold S is applied in particular by limiting any variation of the pitch of the blades 9 of the main rotor 5 relative to a predefined pitch threshold SP.

Furthermore, at least the pitch lever 12 and possibly also the cyclic stick 13 is/are fitted with at least one device 33 for generating tactile signals 34, 35, such as a vibrator or a member delivering an opposing force against a movement of the pitch lever 12 and/or of the cyclic stick 13.

The device 33 for generating tactile signals may be activated by the autopilot 10 in order to alert the human pilot 11 that a request is being made for mechanical power to be supplied by the power plant 1 that is potentially excessive.

For this purpose, when the pitch of the blades 9 of the main rotor 5 is equivalent to said pitch threshold SP, the autopilot generates a first request 37 to activate the tactile signal generator device 33 so as to produce a first tactile signal 34. Thereafter, and where appropriate, if the pitch of the blades 9 of the main rotor 5 is greater than said pitch threshold SP, the autopilot 10 then generates a second request 38 to activate the tactile signal generator device 33 so as to produce a second tactile signal 35.

Furthermore, the auxiliary power unit 4 is advantageously used to contribute to driving rotation of the rotor(s) 5, 6 of the rotorcraft.

The regulator unit 7 is suitable for identifying a deficit in the mechanical power that the power plant 1 needs to deliver in order to act quickly to stabilize the rotorcraft at least in lift as a result of the flight control signals CM1, CM2; CA1, CA2 as issued either by the human pilot 11 or by the autopilot 10, in particular in the event of an engine failure. If such a power deficit is identified, the regulator unit 7 advantageously generates a request 36 to use the auxiliary power plant 4 to supply top-up mechanical power for contributing to driving the rotor(s) 5, 6 of the rotorcraft.

What is claimed is:

1. A method of regulating the speed of rotation, referred to as the speed NR, of at least one main rotor of a multi-engined rotorcraft in the event of a failure of one of a plurality of main engines, referred to as an engine-failure situation, of a power plant of the rotorcraft that supplies mechanical power needed at least for driving rotation of the main rotor, the rotorcraft being provided further with at least one manual flight control member that, on being moved by a human, generates manual flight control signals leading to a variation in the pitch of the blades of the at least one main rotor, an autopilot to generate automatic flight control signals (CA1, CA2) leading to a variation in the pitch of the blades of the at least one main rotor, a regulator unit, a control unit, and a computer, the method comprising:

during a non-engine-failure situation in which none of the main engines are failed,
calculating by the control unit a speed setpoint, referred to as the NR setpoint, having a value that is variable and that is calculated by the control unit depending on the current flight conditions of the rotorcraft in a range of NR setpoint values proportional to the value of a predefined nominal speed (NRnom) for driving the main rotor;
supplying the NR setpoint from the control unit to the regulator unit for regulating the individual operation of the main engines for driving the main rotor at a speed NR in compliance with the NR setpoint; and
driving the main rotor by the power plant in application of the NR setpoint;

while the regulator unit detecting an engine-failure situation in which one of the main engines is failed following the non-engine-failure situation,
selecting by the regulator unit a regulation power rating, known as the OEI power rating, from among a plurality of predefined OEI power ratings and depending on an identified flight stage of the rotorcraft;
applying by the regulator unit the selected OEI power rating to the operation of each main engine that remains operational;
transmitting from the regulator unit "engine-failure" data to the control unit relating to the engine-failure situation being identified by the regulator unit; and then
on the control unit receiving the engine-failure data, generating by the control unit the NR setpoint at a value that is not less than the value of the nominal speed (NRnom); and in the event of there being a flight situation that is unfavorable, in which the value of the current speed NR is less than the value of the nominal speed (NRnom), calculating iteratively by the computer a drive speed for the main rotor referred to as the target speed (NRobj), as follows:
  depending on the current flight situation of the rotorcraft, by identifying firstly the available mechanical power that can be supplied by the power plant in compliance with the current OEI power rating, and secondly the current lift provided by the main rotor; and then
  by identifying a maximum lift that can be provided by the main rotor providing that stabilized lift of the rotorcraft is obtained, on the basis of a speed NR suitable for being reached in as short as possible a length of time from the current speed NR and going to the target speed (NRobj); and then
  in the event of the current speed NR value being less than the target speed (NRobj), generating by the autopilot automatic flight control signals (CA1) to cause the pitch of the blades of the main rotor to vary until drive of the main rotor at the target speed (NRobj) is obtained.

2. The method according to claim 1, wherein on obtaining the stabilized lift of the rotorcraft, the autopilot calculates a stabilized flight situation of the rotorcraft and generates automatic flight control signals (CA2) in compliance with the stabilized flight situation.

3. The method according to claim 2, wherein the stabilized flight situation is calculated in compliance with the rotorcraft advancing at medium speeds.

4. The method according to claim 2, wherein the stabilized flight situation (24) is calculated by taking account of at least one of the rotorcraft flight parameters comprising:
  the current ground height (Hs) of the rotorcraft;
  the current air speed (TAS) of the rotorcraft; and
  the temperature (T) of the ambient outside air surrounding the rotorcraft.

5. The method according to claim 2, wherein the stabilized flight situation of the rotorcraft is calculated on the basis of the autopilot using the current flight stage of the rotorcraft to select a flight stage to be reached from among a previously stored plurality of flight stages.

6. The method according to claim 5, wherein the stabilized flight situation of the rotorcraft is calculated at least as follows:
  in a stage of flight of the rotorcraft close to the ground, the autopilot calculates the stabilized flight situation in compliance with the rotorcraft being guided using a procedure for landing the rotorcraft; and
  in a stage of automatic takeoff of the rotorcraft in which the rotorcraft is guided by the autopilot in application of a pre-established takeoff procedure, the stabilized flight situation is calculated by the autopilot in compliance with the rotorcraft being guided with the takeoff procedure.

7. The method according to claim 2, wherein the stabilized flight situation of the rotorcraft is calculated by the autopilot in application of an NR setpoint having a value not less than a speed threshold (S) of value that is predefined depending on a minimum acceptable speed of rotation of the main rotor for obtaining safe flight of the rotorcraft.

8. The method according to claim 2, wherein the autopilot is set to operate in a calculation mode for calculating the stabilized flight situation by a manual setting control signal issued by a human pilot of the rotorcraft.

9. The method according to claim 1, wherein the autopilot is set to operate in a calculation mode for calculating the stabilized flight situation by an automatic setting control signal generated as a result of the regulator unit generating the engine-failure data.

10. The method according to claim 2, wherein the autopilot is set to operate in a mode for calculating the stabilized flight situation by the autopilot being put into a pre-set state prior to any engine-failure situation.

11. The method according to claim 8, wherein while the autopilot is set to operate in a calculation mode for calculating the stabilized flight situation, the autopilot can be taken out of that calculation mode by the human pilot of the rotorcraft generating a manual control signal for that purpose.

12. The method according to claim 1, wherein on the stabilized lift of the rotorcraft being obtained, a human pilot of the rotorcraft generates manual flight control signals for obtaining stabilized flight guidance of the rotorcraft in application of a pre-established emergency procedure to be found in the flight manual.

13. The method according to claim 12, wherein the emergency procedure is appropriate for guiding the rotorcraft flying at altitude (Al), at a high temperature (T) for the ambient air surrounding the rotorcraft, and with the main rotor being driven at a low speed NR of rotation.

14. The method according to claim 7, wherein the application of an NR setpoint having a value not less than the speed threshold (S) is performed by limiting variation of the pitch of the blades of the main rotor relative to a predefined pitch threshold (SP) for the blades of the main rotor.

15. The method according to claim 14, wherein at least any one of the manual flight control members for causing variation in the pitch of the blades of the main rotor is provided with a device for generating tactile signals producing at least a first tactile signal in the event of the flight mechanics of the rotorcraft detecting a pitch for the blades of the main rotor that is equivalent to the pitch threshold (SP).

16. The method according to claim 15, wherein the device for generating tactile signals generates a second tactile signal in the event of the flight mechanics of the rotorcraft identifying a pitch for the blades of the main rotor that is greater than the pitch threshold (SP).

17. The method according to claim 1, wherein the power plant includes at least one auxiliary power unit, and in the event of the control unit identifying a deficit in power consumption by the main rotor relative to quickly obtaining stabilized lift of the rotorcraft, the regulator unit generates a request for making use of the at least one auxiliary power unit.

18. The method according to claim 17, wherein the at least one auxiliary power unit may equally well be an electric motor and/or a fuel-burning engine.

19. The method according to claim 1, wherein the regulator unit generates a control signal for regulating the individual operation of each of the main engines while taking account at least of firstly the NR setpoint and secondly an anticipation for the mechanical power to be supplied by the power unit as identified by the flight mechanics of the rotorcraft leading to at least one variation in the pitch of the blades of the at least one main rotor.

20. A rotorcraft comprising:
a main rotor;
a power plant having a plurality of main engines to supply mechanical power for driving the main rotor;
a manual flight control member to, on being moved by a human, generate manual flight control signals leading to a variation in the pitch of the blades of the main rotor;
an autopilot to generate automatic flight control signals (CA1, CA2) leading to a variation in the pitch of the blades of the main rotor;
a regulator unit;
a control unit; and
a computer;
wherein during a non-engine-failure situation in which none of the main engines are failed,
 the control unit is configured to calculate a speed setpoint, referred to as the NR setpoint, having a value that is variable and that is calculated by the control unit depending on the current flight conditions of the rotorcraft in a range of NR setpoint values proportional to the value of a predefined nominal speed (NRnom) for driving the main rotor;
 the control unit is further configured to supply the NR setpoint to the regulator unit for regulating the individual operation of the main engines for driving the main rotor at a speed NR in compliance with the NR setpoint; and
 the power plant is configured to drive the main rotor in application of the NR setpoint;
wherein while an engine-failure situation in which one of the main engines is failed following the non-engine-failure situation,
 the regulator unit is configured to select a regulation power rating, known as the OEI power rating, from among a plurality of predefined OEI power ratings and depending on an identified flight stage of the rotorcraft, apply the selected OEI power rating to the operation of each main engine that remains operational, and transmit "engine-failure" data to the control unit relating to the engine-failure situation being detected; and
the control unit is further configured to, on receipt of the engine-failure data, generate the NR setpoint at a value that is not less than the value of the nominal speed (NRnom); and
the computer is configured to, in the event of there being a flight situation that is unfavorable, in which the value of the current speed NR is less than the value of the nominal speed (NRnom), calculate iteratively a drive speed for the main rotor referred to as the target speed (NRobj), as follows:
 depending on the current flight situation of the rotorcraft, by identifying firstly the available mechanical power that can be supplied by the power plant in compliance with the current OEI power rating, and secondly the current lift provided by the main rotor; and then
 by identifying a maximum lift that can be provided by the main rotor providing that stabilized lift of the rotorcraft is obtained, on the basis of a speed NR suitable for being reached in as short as possible a length of time from the current speed NR and going to the target speed (NRobj); and
the autopilot is configured to, in the event of the current speed NR value being less than the target speed (NRobj), generate automatic flight control signals (CA1) to cause the pitch of the blades of the main rotor to vary until drive of the main rotor at the target speed (NRobj) is obtained.

* * * * *